US006832579B2

(12) United States Patent
Cangiarella

(10) Patent No.: US 6,832,579 B2
(45) Date of Patent: Dec. 21, 2004

(54) WASTE GLASS SUBSTRATE

(76) Inventor: Keith Cangiarella, 331 N. Harrington Dr., Fullerton, CA (US) 92831

( * ) Notice: Subject to any disclaimer, the term of this patent is extended or adjusted under 35 U.S.C. 154(b) by 0 days.

(21) Appl. No.: 10/725,162

(22) Filed: Dec. 1, 2003

(65) Prior Publication Data

US 2004/0107915 A1 Jun. 10, 2004

Related U.S. Application Data

(63) Continuation of application No. 10/278,658, filed on Oct. 23, 2002, now abandoned.

(51) Int. Cl.[7] .......................... A01K 63/00; A01K 29/00
(52) U.S. Cl. ....................... 119/246; 119/171; 119/174
(58) Field of Search ................................ 119/246, 171, 119/173, 174; 426/2, 74, 250, 805

(56) References Cited

U.S. PATENT DOCUMENTS

| 3,557,753 A | * | 1/1971 | Dantoni ..................... 119/260 |
| 3,804,064 A | * | 4/1974 | Kuneman et al. ........... 119/246 |
| 4,170,658 A | * | 10/1979 | Skinner et al. ............. 423/430 |
| 5,664,523 A | * | 9/1997 | Ochi et al. ................... 119/173 |
| 6,106,869 A | * | 8/2000 | Botterman et al. ............ 426/2 |
| 6,250,576 B1 | * | 6/2001 | Harada ....................... 241/79.1 |
| 6,391,349 B1 | * | 5/2002 | Botterman et al. ............ 426/2 |
| 6,446,886 B2 | * | 9/2002 | Harada ........................ 241/19 |

* cited by examiner

Primary Examiner—Teri P. Luu
Assistant Examiner—Elizabeth Shaw

(57) ABSTRACT

The present invention involves a terrarium substrate for an animal such as a reptile, arachnid or small mammals. The substrate includes fine glass sand that is healthy and ingestible by the animal.

1 Claim, No Drawings

WASTE GLASS SUBSTRATE

CROSS-REFERENCE TO RELATED APPLICATIONS

This is a continuation of application Ser. No. 10/278,658, filed Oct. 23, 2002, now abandoned.

BACKGROUND

1. Field of Invention

This invention relates to terrarium substrates for animals housed in captivity. This substrate includes fine sand made from waste glass that is healthy, ingestible and moves through the digestive tract during the normal process of digestion 2. Description of Prior Art It is widely known that garbage disposal is a significant problem throughout North America. One particular area of concern has been, and continues to be, the disposal of waste glass.

In the case of bottles, flint, or clear glass, they are relatively easily recycled, and can be used in a variety of ways, for instance, in the production of new bottles, or in fiberglass production. Colored glass, however, is often placed in landfills, where it occupies valuable space, and loses any potential value it may have.

Terrariums are used to house a wide variety of animals, from reptiles to small mammals. As used herein, terrarium generally refers to a cage, tank, or like container used to house one or more animals. A terrarium substrate, the floor covering used in terrariums, is an important part of an animal's habitat, both for aesthetics, ease of clean up, effectiveness of moisture control and control of insects. Terrarium substrates come in all different shapes, sizes and materials, such as ground bark from trees, shaving from trees, litter mixes, moss, vermiculite, ground fine quartz sand, non-abrasive carpet, tile, flora or any combination of the above.

The problem with most terrarium substrates is they come from a non-renewable resource, and are taken from the environment, leaving us with the problem of renewing that resource. Most substrates ingested in small quantities are usually non-toxic, ingested overtime they tend not to pass through the digestive tract, during the natural process of digestion and become impacted in the animal's stomach, which can cause death.

A need therefore exists for a terrarium substrate that comes from an abundant resource, waste glass, which is good for the human environment, the animal's environment, and easily moves through the animal's digestive tract, during the natural process of digestion.

SUMMARY OF THE INVENTION

There are several needs that are addressed and solved by the present invention. The need to take waste glass, and turn it into a reusable product, a terrarium substrate, that will be good for the animal.

An additional aspect of the invention involves a new and novel use for waste glass being recycled into a terrarium substrate.

A further aspect of the invention involves the method of manufacturing a terrarium substrate made of waste glass sand. The method includes steps of providing waste glass, grinding and milling waste glass into sand, thereby forming sand-like particles of glass, and screening the grounded sand.

Other features and advantages of the invention are set forth in the following detailed description, which are intended to illustrate, but not limit, the invention.

DETAILED DESCRIPTION OF PREFERRED EMBODIMENT

A preferred embodiment of the invention will now be described. The present invention involves a terrarium substrate for one or more animals such as, but not limited to, reptiles, arachnids, and small mammals. The terrarium substrate is made of granular glass sand, that is sand-like particles of glass. The glass sand is ingestible and will pass through the digestive tract of one or more of the animals during the natural process of digestion.

The inventor of the present invention recognized that a need exists for a new and safe use for waste glass, as well as a terrarium substrate that could be ingested during the natural feeding habits of animals, as well as everyday life in the terrarium, and would easily pass through the digestive system during the natural process of digestion. It is this recognition that leads the inventor to the novel use of glass sand as a terrarium substrate for animals.

The glass sand preferably used as the terrarium substrate is soda lime glass, although other similar waste glass products can be used.

This type of glass sand is widely used as golf course sand traps media, sandblasting media, water filtration, colored stucco sands, sand art aggregate, hand soap abrasive, epoxy floor sand, and waste treatment. Accordingly, an aspect of the present invention involves the novel use of this type of glass sand as a substrate for animals.

Typical chemical analysis of waste soda lime glass is as follows:

| | |
|---|---|
| $SiO_2$ | 72.50% |
| $Fe_2O_3$ | .20% |
| $Al_2O_3$ | .16% |
| CaO | 9.18% |
| MgO | 3.65% |
| $Na_2O$ | 13.20% |
| $SO_3$ | .39% |
| $K_2O$ | .12% |
| Hardness | 5.5 to 6.5(mohs scale) |
| Specific Gravity | 2.50 |
| Bulk density | 75 pounds per cubic foot |
| Pathological effects - none, inert | |
| Chemical family - glass oxide, CAS #65997-17-3 | |

Other properties of the glass sand, making it ideal for terrarium substrate, includes, the sand is a good conductor of heat, the sand clumps when exposed to liquid such as animal waste, the sand is an excellent egg laying medium for reptiles, and the sand does not harbor insects or the growth of molds or fungus.

In accordance with another aspect of the invention, the glass sand is manufactured by milling waste soda lime glass, into a sand, and then material is screened to 100% passing through a 30 mesh sieve and 100% retained on a 80 mesh sieve.

Although this invention has been described in terms of the preferred embodiment, other embodiments apparent to those of ordinary skill in the art are also within the scope of this invention.

What is claimed is:

1. A method of providing an aggregate as a substrate on the floor of an animal habitat, comprising the following steps, providing glass, creating sand-like particles from the glass, providing an animal habitat having a floor, and providing the sand-like particles of glass on the floor of the animal habitat.

\* \* \* \* \*